(12) United States Patent
Yamazaki (10) Patent No.: US 9,642,172 B2
(45) Date of Patent: May 2, 2017

(54) MOBILE COMMUNICATION SYSTEM, BASE STATION, USER TERMINAL, AND PROCESSOR

(71) Applicant: KYOCERA CORPORATION, Kyoto (JP)

(72) Inventor: Chiharu Yamazaki, Ota-ku (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 14/415,276

(22) PCT Filed: Jul. 23, 2013

(86) PCT No.: PCT/JP2013/069901
§ 371 (c)(1),
(2) Date: Jan. 16, 2015

(87) PCT Pub. No.: WO2014/017476
PCT Pub. Date: Jan. 30, 2014

(65) Prior Publication Data
US 2015/0215977 A1    Jul. 30, 2015

Related U.S. Application Data

(60) Provisional application No. 61/676,766, filed on Jul. 27, 2012.

(51) Int. Cl.
*H04W 72/00*    (2009.01)
*H04W 76/02*    (2009.01)
(Continued)

(52) U.S. Cl.
CPC ........... *H04W 76/021* (2013.01); *H04W 4/08* (2013.01); *H04W 8/005* (2013.01); *H04W 8/26* (2013.01);
(Continued)

(58) Field of Classification Search
None
See application file for complete search history.

(56) References Cited

U.S. PATENT DOCUMENTS

| | | | |
|---|---|---|---|
| 2011/0268006 A1* | 11/2011 | Koskela | H04W 72/121 370/312 |
| 2011/0282989 A1* | 11/2011 | Geirhofer | H04W 28/18 709/224 |
| 2013/0150109 A1 | 6/2013 | Takano | |

FOREIGN PATENT DOCUMENTS

EP    2787658 A1    10/2014
JP    2012-080416 A    4/2012
(Continued)

OTHER PUBLICATIONS

Takano Hiroaki, Base Station, Wireless Communication Method, Program, Wireless Communication System and Wireless Terminal,Apr. 19, 2012, JP 2012-080416 A.*
International Search Report; PCT/JP2013/069901; Aug. 27, 2013.
3GPP TR 22.803 V0.3.0 (May 2012); 3rd Generation Partnership Project; Technical Specification Group SA; Feasibility Study for Proximity Services (ProSe)(Release 12).
(Continued)

*Primary Examiner* — Martin Mushambo
(74) *Attorney, Agent, or Firm* — Studebaker & Brackett PC (57) ABSTRACT

A mobile communication system that supports Device to Device (D2D) communications, comprises: a base station that notifies a plurality of user terminals of a D2D common RNTI that is a radio network temporary identifier (RNTI) which is common in the plurality of user terminals, and that is used to collectively transmit, to the plurality of user terminals, a D2D control signal for controlling the D2D communications.

9 Claims, 8 Drawing Sheets

(51) Int. Cl.
*H04W 4/08* (2009.01)
*H04W 8/26* (2009.01)
*H04W 8/00* (2009.01)
H04W 72/04 (2009.01)
H04W 92/18 (2009.01)

(52) U.S. Cl.
CPC ........ *H04W 72/0406* (2013.01); *H04W 72/04* (2013.01); *H04W 92/18* (2013.01)

(56) References Cited

FOREIGN PATENT DOCUMENTS

| WO | 2011/087826 A1 | 7/2011 |
|----|----------------|--------|
| WO | 2011/123755 A1 | 10/2011 |
| WO | 2011/123814 A2 | 10/2011 |
| WO | 2012/091420 A2 | 7/2012 |

OTHER PUBLICATIONS

The extended European search report issued by the European Patent Office on Feb. 23, 2016, which corresponds to European Patent Application No. 13823258.2-1853 and is related to U.S. Appl. No. 14/415,276.

Communication pursuant to Rules 70(2) and 70a(2) EPC issued by the European Patent Office on Mar. 11, 2016, which corresponds to European Patent Application No. 13823258.2-1853 and is related to U.S. Appl. No. 14/415,276.

* cited by examiner

MOBILE COMMUNICATION SYSTEM, BASE STATION, USER TERMINAL, AND PROCESSOR

This application is based upon and Claims the benefit of priority from the U.S. Provisional Application No. 61/676,766, filed on Jul. 27, 2012; the entire contents of which are incorporated herein by reference.

TECHNICAL FIELD

The present invention relates to a mobile communication system that supports D2D communications.

BACKGROUND ART

In 3GPP (3rd Generation Partnership Project) which is a project aiming to standardize mobile communication systems, the introduction of Device to Device (D2D) communications is discussed as a new function after Release 12 (see Non-patent Document 1).

In the D2D communications, a plurality of user terminals adjacent to one another perform direct radio communications in a frequency band assigned to a mobile communication system. In addition, the D2D communications is also called Proximity Service communications.

PRIOR ART DOCUMENT

Non-Patent Document

NON-PATENT DOCUMENT 1: 3GPP technical report "TR 22. 803 V0. 3. 0" May 2012

SUMMARY OF THE INVENTION

It is considered that in order to perform D2D communications in a mobile communication system, base stations need to at least partially control the D2D communications.

However, the current specifications have a problem in that there is no framework for base stations to appropriately control the D2D communications.

Therefore, the present invention provides a mobile communication system in which base stations are able to appropriately control D2D communications.

According to one embodiment, a mobile communication system that supports Device to Device (D2D) communications, comprises: a base station that notifies a plurality of user terminals of a D2D common RNTI that is a radio network temporary identifier (RNTI) which is common in the plurality of user terminals, and that is used to collectively transmit a D2D control signal for controlling the D2D communications to the plurality of user terminals.

According to one embodiment, a base station in a mobile communication system that supports Device to Device (D2D) communications, comprises: a notification unit that notifies a plurality of user terminals of a D2D common RNTI that is a radio network temporary identifier (RNTI) which is common in the plurality of user terminals, and that is used to collectively transmit a D2D control signal for controlling the D2D communications to the plurality of user terminals.

According to one embodiment, a user terminal in a mobile communication system that supports Device to Device (D2D) communications, comprises: a reception unit that receives from the base station, a D2D common RNTI that is a radio network temporary identifier (RNTI) which is common in a plurality of user terminals, and that is used for a base station to collectively transmit a D2D control signal for controlling the D2D communications to the plurality of user terminals.

According to one embodiment, a processor provided in a user terminal in a mobile communication system that supports Device to Device (D2D) communications, performs: a process of receiving from the base station, a D2D common RNTI that is a radio network temporary identifier (RNTI) which is common in a plurality of user terminals, and that is used for a base station to collectively transmit a D2D control signal for controlling the D2D communications to the plurality of user terminals.

DESCRIPTION OF THE EMBODIMENTS (1) Overview of Embodiment

A mobile communication system according to the present embodiment supports Device to Device (D2D) communications. The mobile communication system includes a base station that notifies a plurality of user terminals of a D2D common RNTI that is a radio network temporary identifier (RNTI), which is common in the plurality of user terminals, and that is used to collectively transmit, to the plurality of user terminals, a D2D control signal for controlling the D2D communications.

Normally, the RNTI is a temporary identifier of the user terminal, and the base station assigns RNTI different depending on each user terminal in order to transmit a control signal for each user terminal. On the other hand, since the D2D common RNTI according to the present embodiment is RNTI that is common in a plurality of user terminals, a base station is able to collectively transmit the D2D control signal to the plurality of user terminals that perform the D2D communications. That is, it is possible to collectively control the plurality of user terminals that perform the D2D communications. Consequently, the base station is able to appropriately control the D2D communications.

When the user terminal starts standing by for the D2D communications, the base station may notify the user terminal of the D2D common RNTI. In this way, it is possible to notify the user terminal, which is likely to start the D2D communications, of the D2D common RNTI.

When the user terminal discovers another user terminal that is being standing by for the D2D communications, the base station may also notify the user terminal of the D2D common RNTI. In this way, it is possible to notify the user terminal, which starts the D2D communications, of the D2D common RNTI. Furthermore, when the other user terminal that is being standing by for the D2D communications has already started the D2D communications, the user terminal which discovered the other user terminal is able to participate in the D2D communications.

Alternatively, when the user terminal discovers another user terminal that is being standing by for the D2D communications, the base station may also notify the user terminal and the other user terminal of the D2D common RNTI. In this way, at the time of start of the D2D communications, it is possible to simultaneously notify a plurality of user terminals, which perform the D2D communications, of the D2D common RNTI.

The D2D common RNTI may be common RNTI in a cell of the base station. The D2D common RNTI is common in the cell, so that the base station is able to collectively control all user terminals that perform the D2D communications in the cell of the base station. In this case, the D2D control signal may include information indicating assignment candidate radio resources that are radio resources available in the D2D communications. In this way, a plurality of user terminals that perform the D2D communications in the cell of the base station are able to recognize radio resources (assignment candidate radio resources) available in the D2D communications in the cell, and to select a specific radio resource from the assignment candidate radio resources.

Alternatively, the D2D common RNTI may differ depending on each group (D2D group) of a user terminal that perform the D2D communications. When the D2D common RNTI is differed depending on each D2D group, the base station becomes able to collectively control all user terminals belonging to each D2D group. In this case, the D2D control signal may include information indicating radio resources dynamically or quasi-statically assigned by the base station for the D2D communications. In this way, the base station is able to perform dynamic or quasi-static radio resource assignment (scheduling) for each D2D group. Moreover, the D2D control signal may include identification information for identifying a transmission side and a reception side in the D2D communications. In this way, the base station is able to individually perform scheduling for each of the transmission-side user terminal and the reception-side user terminal, which belong to the D2D group.

Hereinafter, with reference to the drawings, a description will be provided for an embodiment when the D2D communications is introduced to a cellular mobile communication system (hereinafter, an "LTE system") configured based on the 3GPP standards.

(2) LTE System

Figure 1:
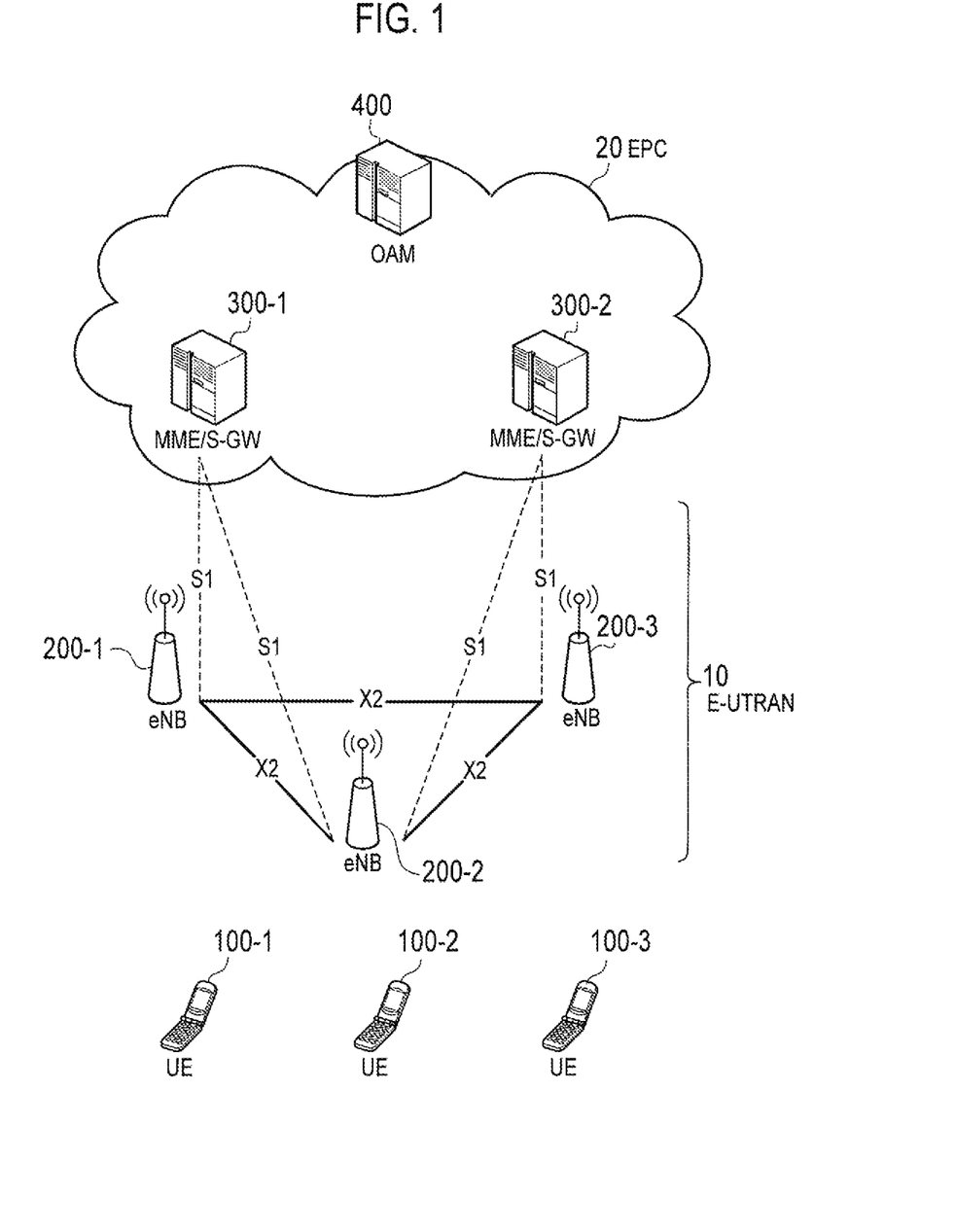
FIG. 1 is a configuration diagram of an LTE system.

FIG. 1 is a configuration diagram of an LTE system according to the present embodiment.

As illustrated in FIG. 1, the LTE system includes a plurality of UEs (User Equipments) 100, E-UTRAN (Evolved-UMTS Terrestrial Radio Access Network) 10, and EPC (Evolved Packet Core) 20. The E-UTRAN 10 and the EPC 20 constitute a network.

The UE 100 is a mobile radio communication device and performs radio communications with a cell (a serving cell) with which a connection is established. The UE 100 corresponds to the user terminal.

The E-UTRAN 10 includes a plurality of eNBs 200 (evolved Node-Bs). The eNB 200 corresponds to the base station. The eNB 200 controls a cell and performs radio communications with the UE 100 that establishes a connection with the cell.

In addition, the "cell" is used as a term indicating a minimum unit of radio communication areas, and is also used as a function of performing radio communications with the UE 100.

The eNB 200, for example, has a radio resource management (RRM) function, a routing function of user data, and a measurement control function for mobility control and scheduling.

The EPC 20 includes MMEs (Mobility management Entities)/S-GWs (Serving-Gateways) 300, and OAM (Operation and Maintenance) 400.

The MME is a network node for performing various mobility controls, etc., for the UE 100 and corresponds to a control station. The S-GW is a network node that performs transfer control of user data and corresponds to a switching center.

The eNBs 200 are connected mutually via an X2 interface. Furthermore, the eNB 200 is connected to the MME/S-GW 300 via an S1 interface.

The OAM 400 is a server device managed by an operator and performs maintenance and monitoring of the E-UTRAN 10.

Next, the configurations of the UE 100 and the eNB 200 will be described.

Figure 2:
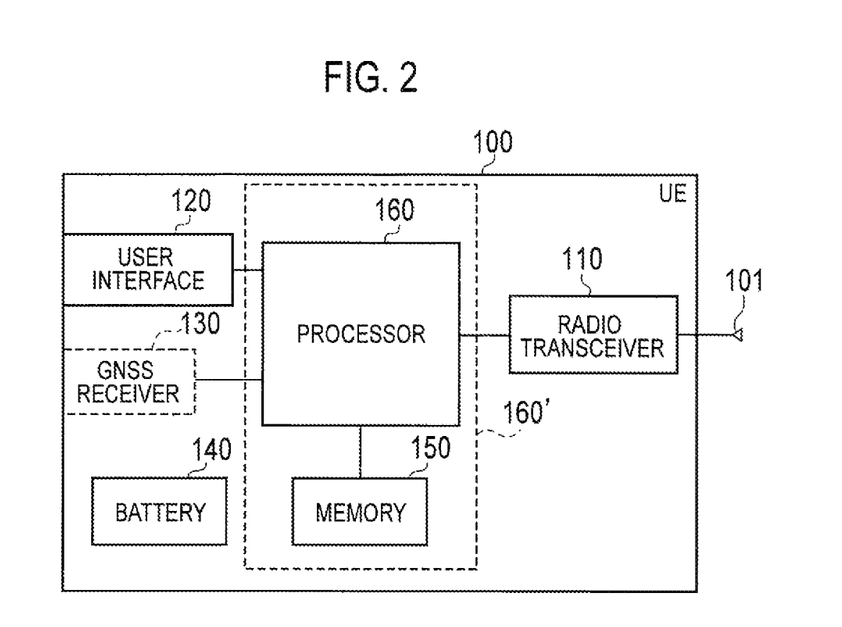
FIG. 2 is a block diagram of UE.

FIG. 2 is a block diagram of the UE 100. As illustrated in FIG. 2, the UE 100 includes an antenna 101, a radio transceiver 110, a user interface 120, a GNSS (Global Navigation Satellite System) receiver 130, a battery 140, a memory 150, and a processor 160. The memory 150 and the processor 160 constitute a control unit.

The UE 100 may not have the GNSS receiver 130. In addition, the memory 150 is integrated with the processor 160, and this set (that is, a chipset) may be called a processor 160'.

The antenna 101 and the radio transceiver 110 correspond to a part of a layer 1 and are used to transmit and receive a radio signal. The antenna 101 includes a plurality of antenna elements. The radio transceiver 110 converts a baseband signal output from the processor 160 into the radio signal, and transmits the radio signal from the antenna 101. Furthermore, the radio transceiver 110 converts the radio signal received by the antenna 101 into the baseband signal, and outputs the baseband signal to the processor 160.

The user interface 120 is an interface with a user carrying the UE 100, and includes, for example, a display, a microphone, a speaker, and various buttons. The user interface 120 receives an operation from a user and outputs a signal indicating the content of the operation to the processor 160.

The GNSS receiver 130 receives a GNSS signal in order to obtain location information indicating a geographical location of the UE 100, and outputs the received signal to the processor 160.

The battery 140 stores a power to be supplied to each block of the UE 100.

The memory 150 stores a program to be executed by the processor 160 and information to be used for a process by the processor 160.

The processor 160 includes a baseband processor configured to perform modulation and demodulation, coding and decoding and the like of the baseband signal, and a CPU (Central Processing Unit) configured to perform various processes by executing the program stored in the memory 150. The processor 160 may further include a codec that performs encoding and decoding of sound and video signals.

The processor 160, for example, performs various processes and implements various communication protocols which will be described later. Details of a process performed by the processor 160 will be described below.

Figure 3:
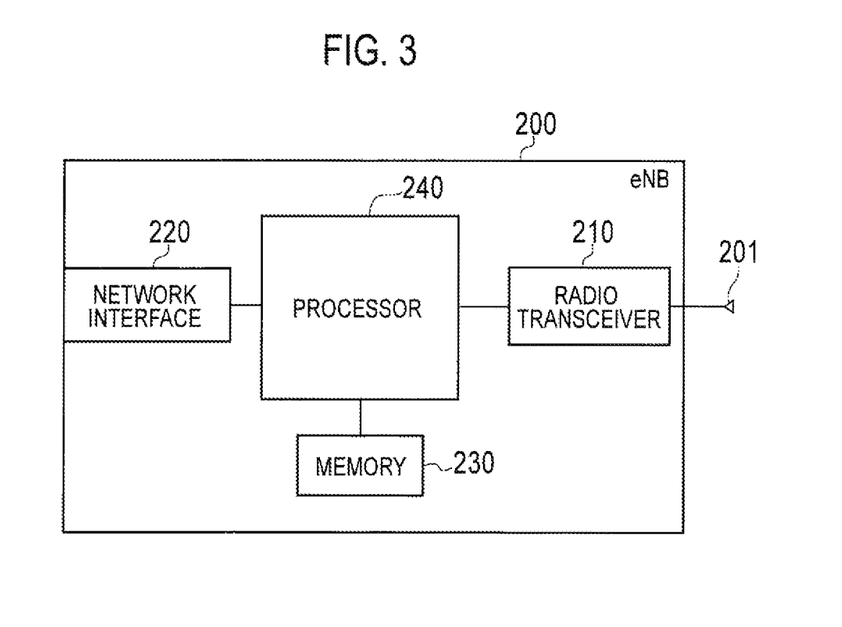
FIG. 3 is a block diagram of eNB.

FIG. 3 is a block diagram of the eNB 200. As illustrated in FIG. 3, the eNB 200 includes an antenna 201, a radio transceiver 210, a network interface 220, a memory 230, and a processor 240. The memory 230 and the processor 240 constitute the control unit.

The antenna 201 and the radio transceiver 210 correspond to a part of a layer 1 and are used to transmit and receive the radio signal. The antenna 201 includes a plurality of antenna elements. The radio transceiver 210 converts the baseband signal output from the processor 240 into the radio signal, and transmits the radio signal from the antenna 201. Furthermore, the radio transceiver 210 converts the radio signal received by the antenna 201 into the baseband signal, and outputs the baseband signal to the processor 240.

The network interface 220 is connected to the neighboring eNB 200 via the X2 interface and is connected to the MME/S-GW 300 via the S1 interface. The network interface 220 is used in communication performed on the X2 interface and communication performed on the S1 interface.

The memory 230 stores a program to be executed by the processor 240 and information to be used for a process by the processor 240.

The processor 240 includes the baseband processor that performs modulation and demodulation, and encoding and decoding of the baseband signal and the CPU that executes the program stored in the memory 230 to perform various processes.

The processor 240, for example, performs various processes and implements various communication protocols which will be described later. Details of a process performed by the processor 240 will be described below.

Figure 4:
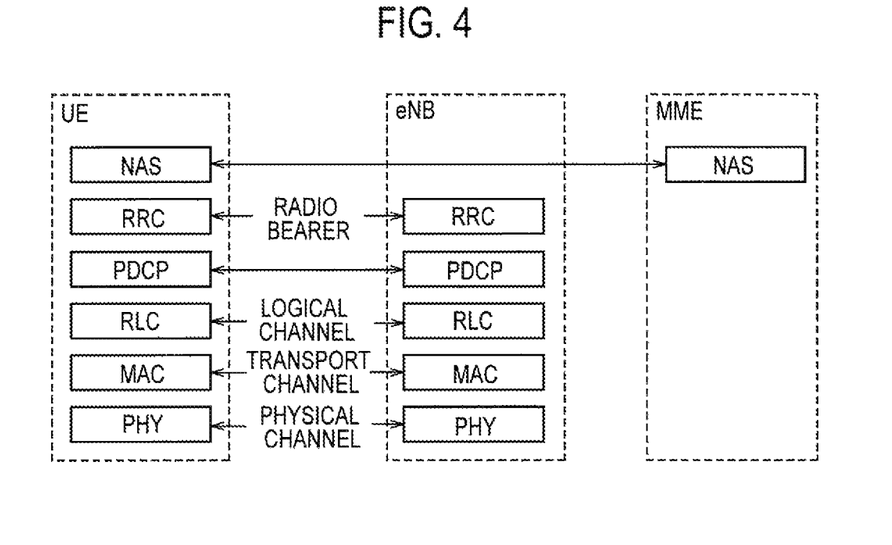
FIG. 4 is a protocol stack diagram of a radio interface in the LTE system.

FIG. 4 is a protocol stack diagram of a radio interface in the LTE system.

As illustrated in FIG. 4, the radio interface protocol is classified into a layer 1 to a layer 3 of an OSI reference model, wherein the layer 1 is a physical (PHY) layer. The layer 2 includes a MAC (Media Access Control) layer, an RLC (Radio Link Control) layer, and a PDCP (Packet Data Convergence Protocol) layer. The layer 3 includes an RRC (Radio Resource Control) layer.

The PHY layer performs encoding and decoding, modulation and demodulation, antenna mapping and demapping, and resource mapping and demapping. The PHY layer provides a transmission service to an upper layer by using a physical channel. Between the PHY layer of the UE 100 and the PHY layer of the eNB 200, data is transmitted through the physical channel.

The MAC layer performs preferential control of data, and a retransmission process and the like by hybrid ARQ (HARQ). Between the MAC layer of the UE 100 and the MAC layer of the eNB 200, data is transmitted through a transport channel. The MAC layer of the eNB 200 includes a transport format of an uplink and a downlink (a transport block size, a modulation and coding scheme, and the like) and a MAC scheduler for determining a resource block to be assigned.

The RLC layer transmits data to an RLC layer of a reception side by using the functions of the MAC layer and the PHY layer. Between the RLC layer of the UE 100 and the RLC layer of the eNB 200, data is transmitted through a logical channel.

The PDCP layer performs header compression and extension, and encryption and decryption.

The RRC layer is defined only in a control plane. Between the RRC layer of the UE 100 and the RRC layer of the eNB 200, a control signal (an RRC message) for various types of setting is transmitted. The RRC layer controls the logical channel, the transport channel, and the physical channel in response to establishment, re-establishment, and release of a radio bearer. When an RRC connection is established between the RRC of the UE 100 and the RRC of the eNB 200, the UE 100 is in a connected state, and when the RRC connection is not established, the UE 100 is in an idle state.

A NAS (Non-Access Stratum) layer positioned above the RRC layer performs session management or mobility management, for example.

Figure 5:
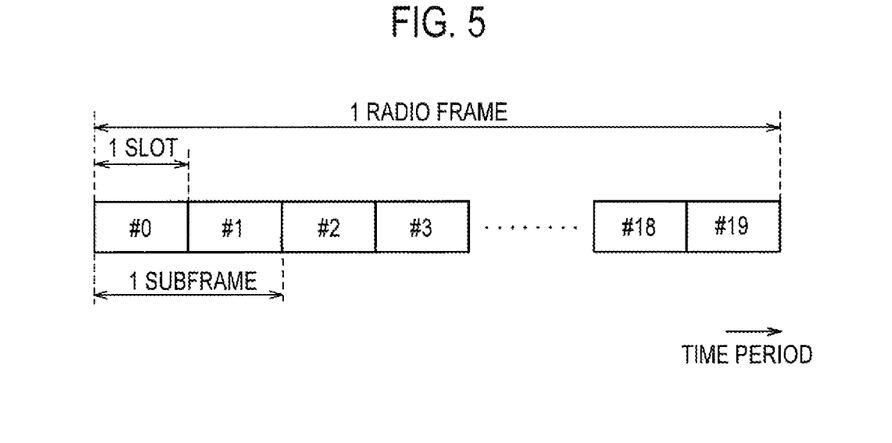
FIG. 5 is a configuration diagram of a radio frame used in the LTE system.

FIG. 5 is a configuration diagram of a radio frame used in the LTE system. In the LTE system, OFDMA (Orthogonal Frequency Division Multiplexing Access) is employed in a downlink, and SC-FDMA (Single Carrier Frequency Division Multiple Access) is employed in an uplink, respectively.

As illustrated in FIG. 5, the radio frame includes 10 subframes arranged in a time direction, wherein each subframe includes two slots arranged in the time direction. Each subframe has a length of 1 ms and each slot has a length of 0.5 ms. Each subframe includes a plurality of resource blocks (RBs) in a frequency direction, and a plurality of symbols in the time direction. Each symbol is provided at a head thereof with a guard interval called a cyclic prefix (CP).

Among radio resources assigned to the UE 100, a frequency resource is designated by a resource block and a time resource is designated by a subframe. That is, the radio resource is designated by a combination of the resource block and the subframe.

In the downlink, an interval of several symbols at the head of each subframe is a control region mainly used as a physical downlink control channel (PDCCH). Furthermore, the remaining interval of each subframe is a region mainly used as a physical downlink shared channel (PDSCH).

The PDCCH carries a control signal called downlink control information (DCI). The DCI, for example, includes uplink scheduling information, downlink scheduling information, and a TPC bit. The uplink SI is a signal that indicates the assignment of an uplink resource block. The downlink SI is a signal that indicates the assignment of a downlink resource block. The TPC bit is a signal that indicates increase and decrease in power of a signal that is transmitted through the uplink channel.

The DCI includes a CRC (Cyclic Redundancy Check) bit masked with RNTI, and when a result obtained by performing decoding and CRC inspection for DCI by using RNTI of the UE 100 indicates success, the UE 100 recognizes that the DCI is DCI addressed to the UE 100. That is, the eNB 200 uses RNTI in order to designate the UE 100 that is a transmission destination in the PDCCH.

In the uplink, both ends in the frequency direction of each subframe are control regions mainly used as a physical uplink control channel (PUCCH). Furthermore, the center portion in the frequency direction of each subframe is a region mainly used as a physical uplink shared channel (PUSCH).

(3) D2D Communications

Next, the D2D communications will be described with comparing the normal communication (the cellular communication) in the LTE system.

Figure 6:
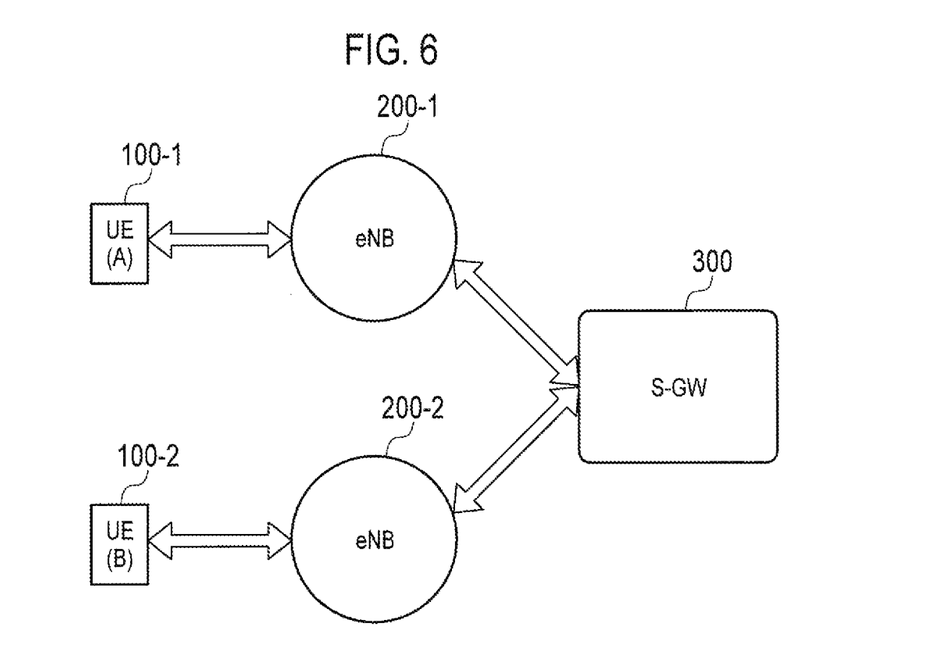
FIG. 6 illustrates a data path in cellular communications.

FIG. 6 illustrates a data path in the cellular communication. FIG. 6 illustrates the case in which the cellular communication is performed between UE 100-1 that establishes a connection with eNB 200-1 and UE 100-2 that establishes a connection with eNB 200-2. In addition, the data path indicates a transfer path of user data (a user plane).

As illustrated in FIG. 6, the data path of the cellular communication passes through the network. Specifically, the data path is set to pass through the eNB 200-1, the S-GW 300, and the eNB 200-2.

Figure 7:
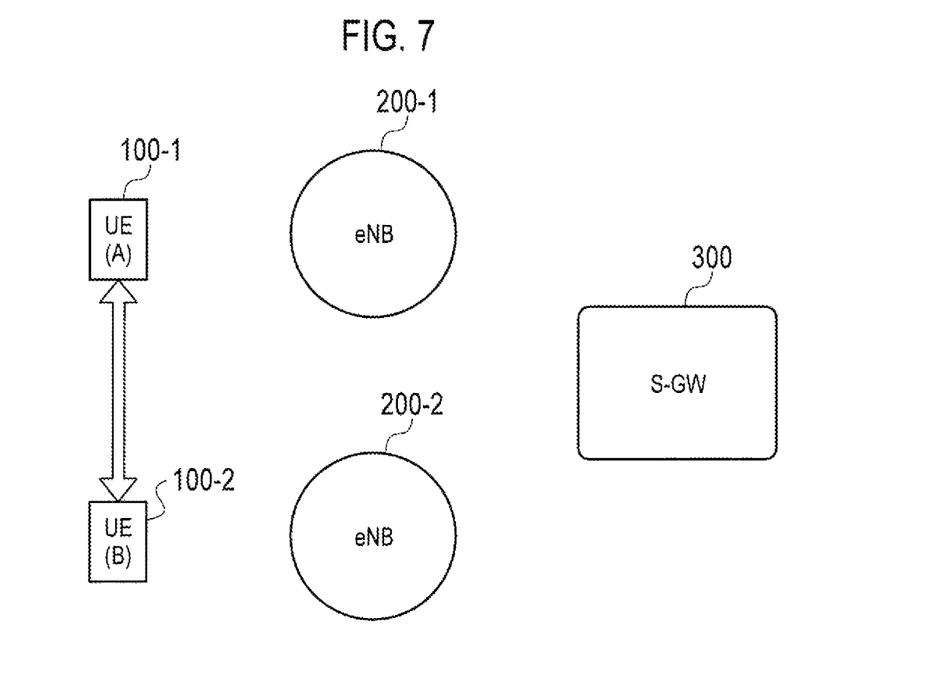
FIG. 7 illustrates a data path in D2D communications.

FIG. 7 illustrates a data path in the D2D communications. FIG. 7 illustrates the case in which the D2D communications is performed between the UE 100-1 that establishes a connection with the eNB 200-1 and the UE 100-2 that establishes a connection with the eNB 200-2.

For example, one UE 100 of the UE 100-1 and the UE 100-2 discovers the other UE 100 existing in the vicinity of the one UE 100, so that the D2D communications start. In addition, in order to start the D2D communications, the UE 100 has a (Discover) function of discovering the other UE 100 existing in the vicinity of the UE 100. Furthermore, the UE 100 has a (Discoverable) function discovered by the other UE 100.

As illustrated in FIG. 7, the data path of the D2D communication does not pass through the network. That is, direct radio communication is performed between the UEs. As described above, when the UE 100-2 exists in the vicinity of the UE 100-1, the D2D communication is performed between the UE 100-1 and the UE 100-2, thereby obtaining an effect that a traffic load of the network and a battery consumption amount of the UE 100 are reduced.

Furthermore, the D2D communication is considered to be performed in a frequency band of the LTE system, and for example, in order to avoid interference to the cellular communication, the D2D communication is performed under the control of the network (eNB 200). A radio resource assignment scheme for the D2D communication mainly includes the following two schemes.

According to the first assignment scheme, the UE 100 is able to select radio resources to be used in the D2D communication. Specifically, the eNB 200 transmits, to the UE 100, information indicating assignment candidate radio resources that are radio resources available in the D2D communication. The UE 100 autonomously selects radio resources to be used in the D2D communication from the assignment candidate radio resources.

Figure 8:
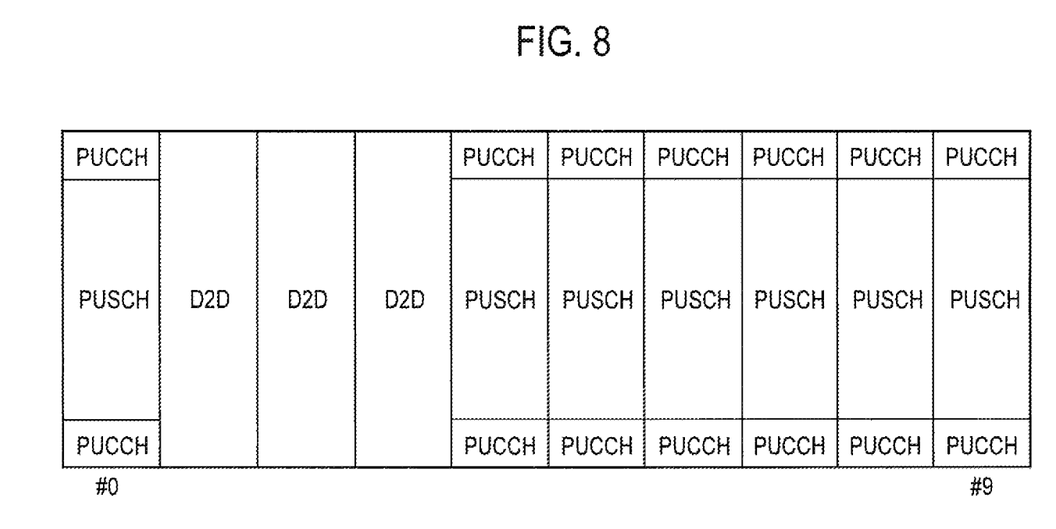
FIG. 8 is a diagram for explaining an example of resource assignment in a first assignment scheme.

FIG. 8 is a diagram for explaining an example of resource assignment in the first assignment scheme. Hereinafter, considered in the case in which the D2D communication is performed in an uplink frequency band.

As illustrated in FIG. 8, the eNB 200 designates specific subframes as the assignment candidate radio resources that are radio resources available in the D2D communications. In the example in FIG. 8, subframes from a second subframe (a subframe #1) to a fourth subframe (a subframe #3) within the radio frame are designated as assignment candidate radio resources. The UE 100, which is to perform the D2D communication, selects resource blocks and subframes to be used in the D2D communication from the assignment candidate radio resources.

According to the second assignment scheme, the eNB 200 determines radio resources to be used in the D2D communication. That is, the UE 100 has no selection right of the radio resource to be used in the D2D communication. Specifically, the eNB 200 transmits, to the UE 100, information indicating radio resources dynamically or quasi-statically assigned for the D2D communication. The UE 100 performs the D2D communication by using the assigned radio resource.

Figure 9:
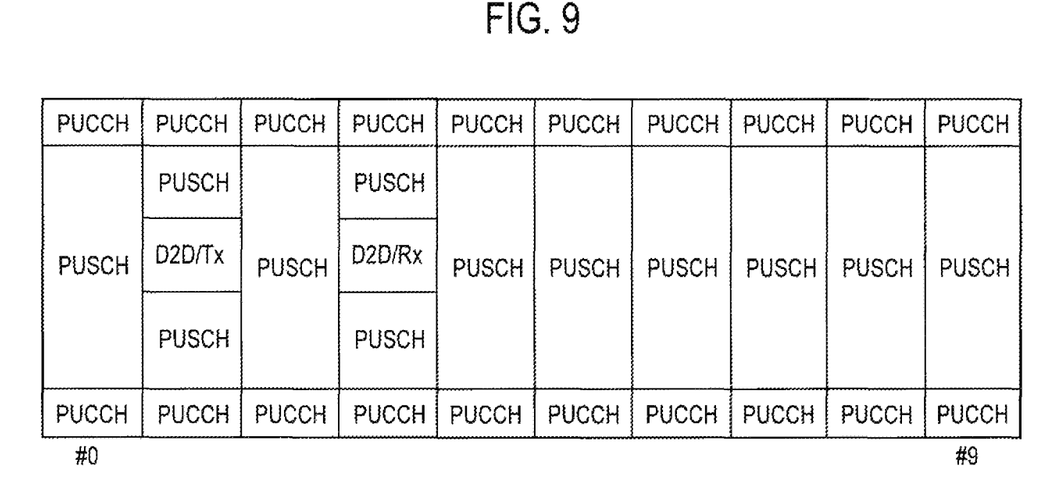
FIG. 9 is a diagram for explaining an example of resource assignment in a second assignment scheme.

FIG. 9 is a diagram for explaining an example of resource assignment in the second assignment scheme. Hereinafter, considered in the case in which the D2D communication is performed in an uplink frequency band.

As illustrated in FIG. 9, the eNB 200 designates a specific resource block of a specific subframe as an assignment radio resource to be used in the D2D communication. In the example in FIG. 9, a part of resource blocks in a second subframe (a subframe #1) and a part of resource blocks in a fourth subframe (a subframe #3) within the radio frame are designated as assignment radio resources. The UE 100, which is to perform the D2D communication, performs the D2D communication by using radio resources assigned from the eNB 200.

In addition, transmission (Tx) in the second subframe (the subframe #1) indicates transmission in one UE 100 in a D2D group, and the other UE 100 performs reception (Rx). Reception (Rx) in the fourth subframe (the subframe #3) indicates reception in one UE 100 in the D2D group, and the other UE 100 performs transmission (Tx).

(4) Operation

Hereinafter, the operation according to the embodiment will be described.

(4.1) RNTI Assignment

The eNB 200 notifies a plurality of UEs 100 of a D2D common RNTI that is a radio network temporary identifier (RNTI) which is common in the plurality of UEs 100 and that is used to collectively transmit a D2D control signal for controlling the D2D communication to the plurality of UEs 100.

For example, the D2D control signal is at least one of: DCI for D2D that is transmitted on the PDCCH; and an RRC message for D2D that is transmitted on the PDSCH. The D2D control signal includes resource assignment information (hereinafter, "D2D scheduling information") on the D2D communication. Furthermore, the D2D control signal may also include information instructing the start and end of the D2D communication. Moreover, the D2D control signal may also include information for controlling transmission power in the D2D communication.

When the D2D control signal is the DCI for D2D, the eNB 200 transmits the D2D scheduling information, which includes a CRC bit masked with the D2D common RNTI, on the PDCCH. When a result obtained by performing decoding and CRC inspection for the D2D scheduling information by using the D2D common RNTI notified to the UE 100 indicates success, the UE 100 recognizes that the D2D common RNTI is D2D scheduling information addressed to the UE 100.

In the present embodiment, the following two types of RNTIs are defined as the D2D common RNTI.

D2D RNTI

The D2D RNTI is RNTI that is common in the cell of the eNB 200. The D2D RNTI is common in the cell, so that the eNB 200 is able to collectively control all UEs 100 that perform the D2D communication in the cell of the eNB200. In the aforementioned first assignment scheme, the D2D RNTI is appropriate for collectively transmitting D2D scheduling information indicating an assignment candidate radio resource to each cell.

D2D Group RNTI

The D2D group RNTI is RNTI that differs depending on each D2D group which is a group of user terminals that perform the D2D communication. When the D2D group RNTI is differed depending on each D2D group, the eNB 200 becomes able to collectively control all UEs 100 belonging to each D2D group. In the aforementioned second assignment scheme, the D2D group RNTI is appropriate for collectively transmitting D2D scheduling information indicating an assignment radio resource to each D2D group.

(4.1.1) RNTI Assignment Pattern 1

Next, by using FIG. 10, an assignment pattern 1 of the D2D common RNTI will be described.

Figure 10:
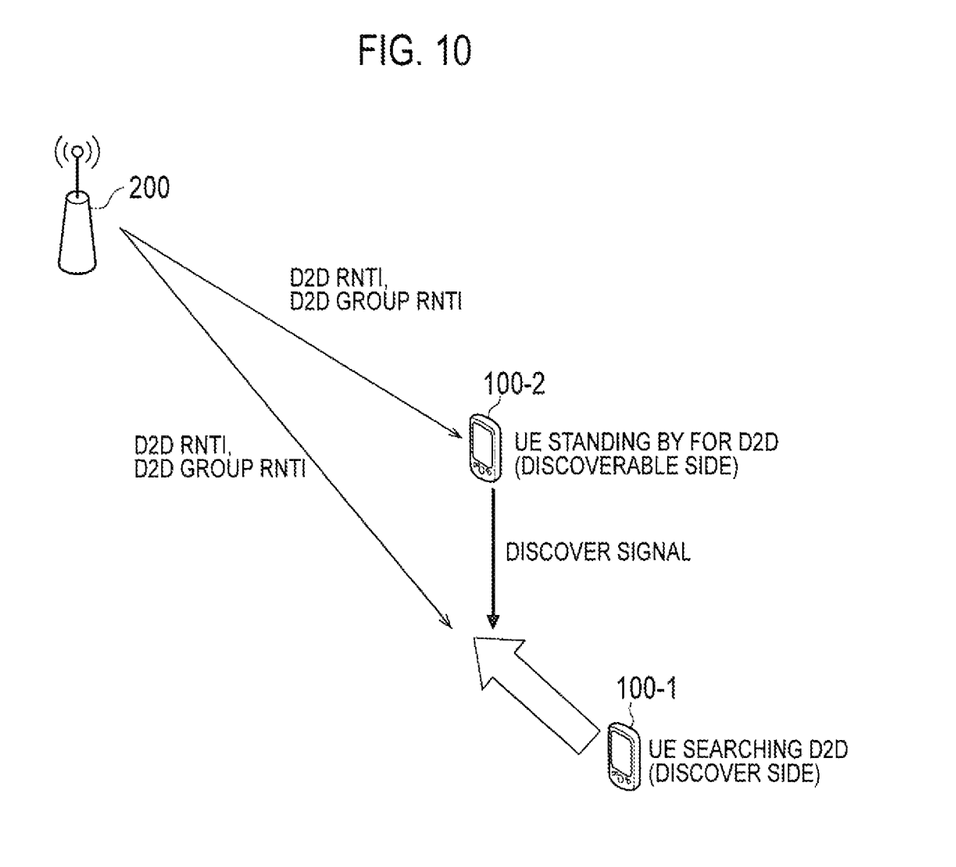
FIG. 10 is a diagram for explaining an assignment pattern of D2D common RNTI.

As illustrated in FIG. 10, firstly, the UE 100-2 starts standing by for the D2D communication according to an instruction from the eNB 200 or voluntarily. In the case of voluntarily starting standing by for the D2D communication, the UE 100-2 notifies the eNB 200 of starting standing by for the D2D communication. When the UE 100-2 starts standing by for the D2D communication, the eNB 200 notifies the UE 100-2 of the D2D common RNTI (the D2D RNTI and the D2D group RNTI). In this way, it is possible to notify UE 100, which is likely to start the D2D communication, of the D2D common RNTI.

Secondly, the UE 100-2 that started standing by for the D2D communication periodically transmits a Discover signal for informing the surrounding of the existence thereof. The Discover signal may have a configuration based on the D2D group RNTI. For example, a resource element (a resource unit including one subcarrier and one symbol) used as the Discover signal or a sequence used in the transmission of the Discover signal may be determined on the basis of the D2D group RNTI.

Thirdly, the UE 100-1 that searches the D2D communication discovers the UE 100-2 in response to the reception of the Discover signal from the UE 100-2. When the UE 100-1 that discovers the UE 100-2 that is being standing by for the D2D communication, the eNB 200 notifies the UE 100-1 of the D2D common RNTI (the D2D RNTI and the D2D group RNTI). Specifically, the UE 100-1 notifies the eNB 200 of the discovery of the UE 100-2 that is being standing by for the D2D communication, and in response to the notification, the eNB 200 notifies the UE 100-1 of the D2D common RNTI. In this way, it is possible to notify the UE 100-1, which starts the D2D communication, of the D2D common RNTI. Furthermore, when the UE 100-2 that is being standing by for the D2D communication has already started the D2D communication, the UE 100-1 that discovered the UE 100-2 is able to participate in the D2D communication.

(4.1.2) RNTI Assignment Pattern 2

Next, by using FIG. 10 again, an assignment pattern 2 of the D2D common RNTI will be described. In the aforementioned assignment pattern 1, the eNB 200 notifies the UE 100-1 and the UE 100-2 of the D2D common RNTI at different timings. However, in the assignment pattern 2, the eNB 200 notifies the UE 100-1 and the UE 100-2 of the D2D common RNTI at the same timing.

As illustrated in FIG. 10, firstly, the UE 100-2 starts standing by for the D2D communication according to an instruction from the eNB 200 or voluntarily.

Secondly, the UE 100-2 that started standing by for the D2D communication periodically transmits a Discover signal for informing the surrounding of the existence thereof.

Thirdly, the UE 100-1 that searches the D2D communication discovers the UE 100-2 in response to the reception of the Discover signal from the UE 100-2. When the UE 100-1 discovers the UE 100-2 that is being standing by for the D2D communication, the eNB 200 notifies the UE 100-1 and the UE 100-2 of the D2D common RNTI (the D2D RNTI and the D2D group RNTI). Specifically, the UE 100-1 notifies the eNB 200 of the discovery of the UE 100-2 that is being standing by for the D2D communication, and in response to the notification, the eNB 200 notifies the UE 100-1 and the UE 100-2 of the D2D common RNTI. In this way, at the time of start of the D2D communication, it is possible to simultaneously notify a plurality of UEs 100, which perform the D2D communication, of the D2D common RNTI.

(4.2) Resource Assignment

Hereinafter, a description will be provided for an operation for assigning radio resources for D2D by using the D2D common RNTI (the D2D RNTI and the D2D group RNTI) assigned as described above.

(4.2.1) Resource Assignment Pattern 1

By using FIG. 11, an assignment pattern 1 of the radio resource for D2D will be described. The assignment pattern 1 corresponds to the aforementioned first assignment scheme.

Figure 11:
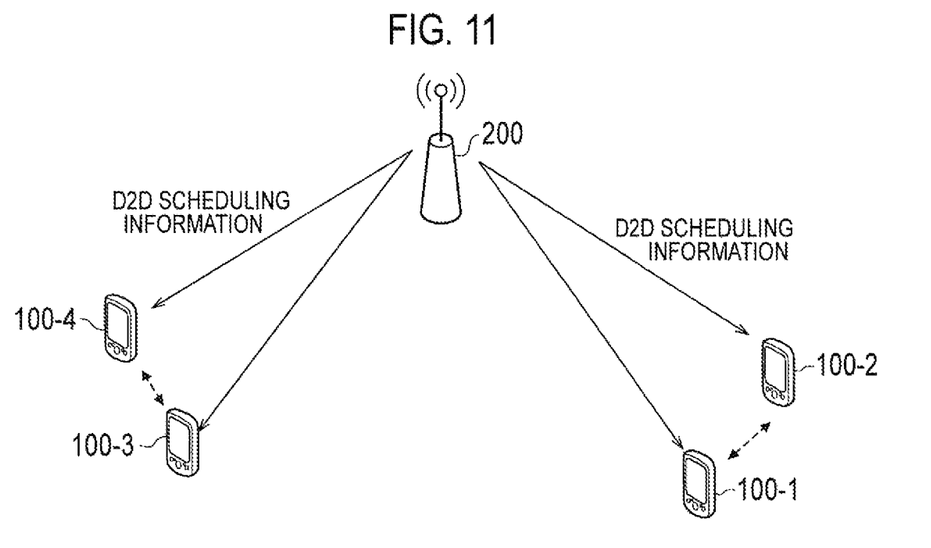
FIG. 11 is a diagram for explaining an assignment pattern 1 of radio resources for D2D.

As illustrated in FIG. 11, firstly, the eNB 200 transmits, on the PDCCH, D2D scheduling information indicating assignment candidate radio resources that are radio resources available in the D2D communication. At this time, the eNB 200 inserts a CRC bit masked with D2D RNTI that is common in the cell of the eNB 200 into the D2D scheduling information, and transmits the D2D scheduling information when the CRC bit is inserted.

Secondly, when a result obtained by performing decoding and CRC inspection for the D2D scheduling information by using the D2D RNTI notified to the UE 100 indicates success, the UE 100 that receives the D2D scheduling information recognizes that the D2D scheduling information is D2D scheduling information addressed to the UE 100. Then, the UE 100 selects radio resources (a resource block and a subframe) to be used in the D2D communication from the assignment candidate radio resources indicated by the D2D scheduling information, and performs the D2D communication.

(4.2.2) Resource Assignment Pattern 2

By using FIG. 12, an assignment pattern 2 of the radio resource for D2D will be described. The assignment pattern 2 corresponds to the aforementioned second assignment scheme.

Figure 12:
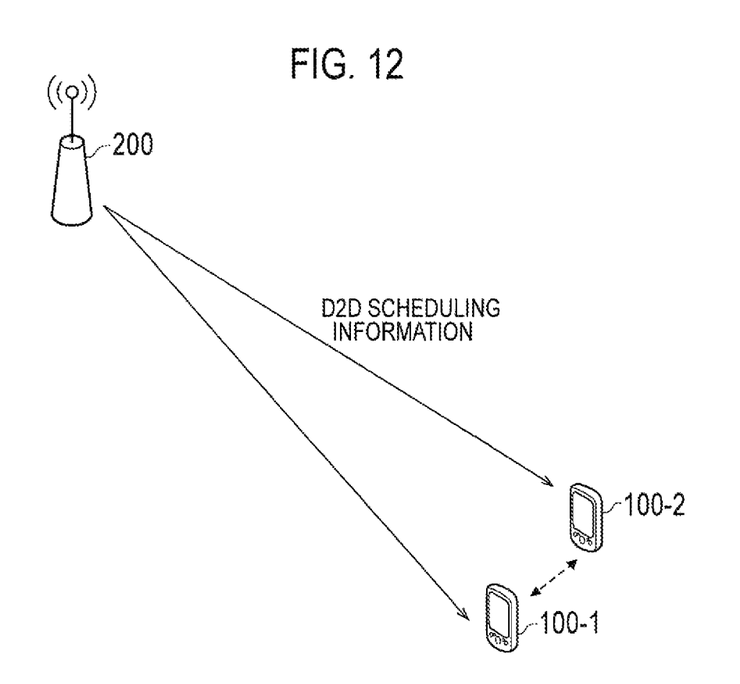
FIG. 12 is a diagram for explaining an assignment pattern 2 of the radio resource for D2D.

As illustrated in FIG. 12, firstly, the eNB 200 transmits, on the PDCCH, D2D scheduling information indicating radio resources dynamically or quasi-statically assigned to each D2D communication group. At this time, the eNB 200 inserts a CRC bit masked with corresponding D2D group RNTI into the D2D scheduling information, and transmits the D2D scheduling information where CRC bit is inserted. Moreover, the eNB 200 transmits information (transmission/reception identification information) indicating whether the D2D scheduling information is addressed to a transmission-side UE 100 or a reception-side UE 100, together with the D2D scheduling information.

Secondly, when a result obtained by performing decoding and CRC inspection for the D2D scheduling information by using the D2D group RNTI notified to the UE 100 indicates success, the UE 100 that receives the D2D scheduling information recognizes that the D2D scheduling information is D2D scheduling information addressed to a D2D group to which the UE 100 belongs. Furthermore, in response to the transmission/reception identification information received together with the D2D scheduling information, the UE 100 acquires D2D scheduling information consistent with whether the UE 100 is a transmission-side or a reception-side. After predetermined subframes (for example, four subframes) pass after the D2D scheduling information is received, the UE 100 performs the D2D communication by using the radio resource designated by the D2D scheduling information.

(5) Conclusion

As described above, the eNB 200 notifies a plurality of UEs 100 of the D2D common RNTI that is RNTI which is common in the plurality of UEs 100 and is used to collectively transmit the D2D control signal for controlling the D2D communication to the plurality of UEs 100. Since the D2D common RNTI according to the present embodiment is RNTI which is common in the plurality of UEs 100, the eNB 200 is able to collectively transmit the D2D control signal to the plurality of UEs 100 that perform the D2D communication. That is, it is possible to simultaneously control the plurality of UEs 100 that perform the D2D communication. Consequently, the eNB 200 is able to appropriately control the D2D communication.

(6) Other Embodiments

Thus, the present invention has been described with the embodiment. However, it should not be understood that those descriptions and drawings constituting a part of the present disclosure limit the present invention. From this disclosure, a variety of alternate embodiments, examples, and applicable techniques will become apparent to the person skilled in the art.

For example, the aforementioned embodiment describes the case in which the D2D communication is performed in the uplink frequency band. However, the D2D communication may be performed in a downlink frequency band or a frequency band (a component carrier for D2D) for D2D.

INDUSTRIAL APPLICABILITY

As described above, the present invention is useful in radio communication fields such as mobile communications since the base station can control D2D communications appropriately.

The invention claimed is:

1. A mobile communication system that supports Device to Device (D2D) communications, comprising:
a base station configured to notify a plurality of user terminals of a D2D common RNTI that is a radio network temporary identifier (RNTI) which is common in the plurality of user terminals, and that is used to collectively transmit, to the plurality of user terminals, a D2D control signal for controlling the D2D communications, wherein
the D2D control signal includes one or more specific subframes as information indicating assignment candidate radio resources that are radio resources available in the D2D communications,
the D2D common RNTI is a first D2D common RNTI or a second D2D common RNTI,
the first D2D common RNTI is a RNTI that is common in a cell of the base station,
the second D2D common RNTI is a RNTI that differs depending on each D2D group which is a group of user terminals that perform the D2D communications,
the base station is configured to notify the plurality of user terminals of the first D2D common RNTI when a radio resource assignment scheme for the D2D communications is a first assignment scheme in which the plurality of user terminals select one or more resource blocks and subframes to use in the D2D communications from the assignment candidate radio resources included in the D2D control signal, and
the base station is configured to notify the plurality of user terminals of the second D2D common RNTI, which differs depending on each D2D group that is a group of user terminals that perform the D2D communications, when the radio resource assignment scheme is a second assignment scheme in which the base station determines radio resources to be used in the D2D communications depending on available radio resources available in the D2D communications.

2. The mobile communication system according to claim 1, wherein
when a user terminal starts standing by for the D2D communications, the base station notifies the user terminal of the D2D common RNTI.

3. The mobile communication system according to claim 1, wherein when a user terminal discovers another user terminal that is standing by for the D2D communications, the base station notifies the user terminal of the D2D common RNTI.

4. The mobile communication system according to claim 1, wherein when a user terminal discovers another user terminal that is standing by for the D2D communications, the base station notifies the user terminal and the another user terminal of the D2D common RNTI.

5. The mobile communication system according to claim 1, wherein
the D2D control signal includes information indicating radio resources dynamically or quasi-statically assigned by the base station for the D2D communications.

6. The mobile communication system according to claim 1, wherein
the D2D control signal includes identification information for identifying a transmission side and a reception side in the D2D communications.

7. A base station in a mobile communication system that supports Device to Device (D2D) communications, comprising:
a notification unit configured to notify a plurality of user terminals of a D2D common RNTI that is a radio network temporary identifier (RNTI) which is common in the plurality of user terminals, and that is used to collectively transmit, to the plurality of user terminals, a D2D control signal for controlling the D2D communications, wherein
the D2D control signal includes one or more specific subframes as information indicating assignment candidate radio resources that are radio resources available in the D2D communications,
the D2D common RNTI is a first D2D common RNTI or a second D2D common RNTI,
the first D2D common RNTI is a RNTI that is common in a cell of the base station,
the second D2D common RNTI is a RNTI that differs depending on each D2D group which is a group of user terminals that perform the D2D communications,
the notification unit is configured to notify the plurality of user terminals of the first D2D common RNTI when a radio resource assignment scheme for the D2D communications is a first assignment scheme in which the plurality of user terminals select one or more resource blocks and subframes to use in the D2D communications from the assignment candidate radio resources included in the D2D control signal, and
the notification unit is configured to notify the plurality of user terminals of the second D2D common RNTI, which differs depending on each D2D group that is a group of user terminals that perform the D2D communications, when the radio resource assignment scheme is a second assignment scheme in which the base station determines radio resources to be used in the D2D communications depending on available radio resources available in the D2D communications.

8. A user terminal in a mobile communication system that supports Device to Device (D2D) communications, comprising:
a reception unit configured to receive from a base station, a D2D common RNTI that is a radio network temporary identifier (RNTI) which is common in a plurality of user terminals, and that is used for the base station to collectively transmit, to the plurality of user terminals, a D2D control signal for controlling the D2D communications, wherein
the D2D control signal includes one or more specific subframes as information indicating assignment candidate radio resources that are radio resources available in the D2D communications,
the D2D common RNTI is a first D2D common RNTI or a second D2D common RNTI,
the first D2D common RNTI is a RNTI that is common in a cell of the base station,
the second D2D common RNTI is a RNTI that differs depending on each D2D group which is a group of user terminals that perform the D2D communications,
the reception unit is configured to receive from the base station, the first D2D common RNTI when a radio resource assignment scheme for the D2D communications is a first assignment scheme in which the plurality of user terminals selects one or more resource blocks and subframes to use in the D2D communications from the assignment candidate radio resources included in the D2D control signal, and
the reception unit is configured to receive from the base station, the second D2D common RNTI, which differs depending on each D2D group that is a group of user terminals that perform the D2D communications, when the radio resource assignment scheme is a second assignment scheme in which the base station determines radio resources to be used in the D2D communications depending on available radio resources available in the D2D communications.

9. A processor provided in a user terminal in a mobile communication system that supports Device to Device (D2D) communications, wherein the processor performs:
a process of receiving from a base station, a D2D common RNTI that is a radio network temporary identifier (RNTI) which is common in a plurality of user terminals, and that is used for the base station to collectively transmit, to the plurality of user terminals, a D2D control signal for controlling the D2D communications, wherein
the D2D control signal includes one or more specific subframes as information indicating assignment candidate radio resources that are radio resources available in the D2D communications,
the D2D common RNTI is a first D2D common RNTI or a second D2D common RNTI,
the first D2D common RNTI is a RNTI that is common in a cell of the base station,
the second D2D common RNTI is a RNTI that differs depending on each D2D group which is a group of user terminals that perform the D2D communications,
the processor performs:
a process of receiving from the base station, the first D2D common RNTI when a radio resource assignment scheme for the D2D communications is a first assignment scheme in which the plurality of user terminals selects one or more resource blocks and subframes to use in the D2D communications from the assignment candidate radio resources included in the D2D control signal; and
a process of receiving from the base station, the second D2D common RNTI, which differs depending on each D2D group that is a group of user terminals that perform the D2D communications, when the radio resource assignment scheme is a second assignment scheme in which the base station determines radio resources to be used in the D2D communications depending on available radio resources available in the D2D communications.

* * * * *